(12) United States Patent
Adam

(10) Patent No.: US 9,815,390 B2
(45) Date of Patent: Nov. 14, 2017

(54) ROTATIONAL DEVICE FOR A VEHICLE SEAT, AND VEHICLE SEAT

(71) Applicant: JOHNSON CONTROLS COMPONENTS GMBH & CO. KG, Kaiserslautern (DE)

(72) Inventor: Joerg Adam, Oberreidenbach (DE)

(73) Assignee: JOHNSON CONTROLS COMPONENTS GMBH & CO. KG, Kaiserslautern (DE)

( * ) Notice: Subject to any disclaimer, the term of this patent is extended or adjusted under 35 U.S.C. 154(b) by 0 days.

(21) Appl. No.: 15/029,936

(22) PCT Filed: Oct. 10, 2014

(86) PCT No.: PCT/EP2014/071739
§ 371 (c)(1),
(2) Date: Apr. 15, 2016

(87) PCT Pub. No.: WO2015/055523
PCT Pub. Date: Apr. 23, 2015

(65) Prior Publication Data
US 2016/0229314 A1 Aug. 11, 2016

(30) Foreign Application Priority Data

Oct. 17, 2013 (DE) .................. 10 2013 221 095
Jan. 28, 2014 (DE) .................. 10 2014 201 454

(51) Int. Cl.
*B60N 2/14* (2006.01)
*F16C 19/54* (2006.01)

(52) U.S. Cl.
CPC .............. *B60N 2/14* (2013.01); *B60N 2/146* (2013.01); *F16C 19/54* (2013.01)

(58) Field of Classification Search
CPC ............ B60N 2/14; B60N 2/146; F16C 19/54
USPC ...................................... 297/344.26
See application file for complete search history.

(56) References Cited

U.S. PATENT DOCUMENTS

| | | | | |
|---|---|---|---|---|
| 3,063,714 A | * | 11/1962 | Krauss | A63B 22/14 108/139 |
| 4,557,520 A | * | 12/1985 | Simjian | A47C 3/18 297/344.26 X |
| 5,110,181 A | * | 5/1992 | Simjian | A47C 1/04 297/344.21 X |
| 5,292,179 A | * | 3/1994 | Forget | B60N 2/143 297/344.24 X |
| 5,651,576 A | | 7/1997 | Wallace | |
| 5,810,441 A | * | 9/1998 | Ezuka | B60N 2/143 297/344.26 X |
| 6,021,989 A | * | 2/2000 | Morita | B60N 2/143 297/344.26 X |

(Continued)

FOREIGN PATENT DOCUMENTS

CN      11 88 053 A    7/1998
CN    201 333 952 Y   10/2009
(Continued)

*Primary Examiner* — Rodney B White
(74) *Attorney, Agent, or Firm* — McGlew and Tuttle, P.C.

(57) ABSTRACT

A rotational device (10) for a vehicle seat includes a base element (20) and a seat part support (30) which can be rotated about a rotational axis (S) with respect to the base element (20). At least three rolling bearings (61, 62, 63) are provided to rotationally support the seat part support (30).

16 Claims, 4 Drawing Sheets

(56) References Cited

U.S. PATENT DOCUMENTS

| | | | |
|---|---|---|---|
| 6,575,420 B2* | 6/2003 | Yoshida | B60N 2/14 297/344.26 X |
| 9,211,812 B2* | 12/2015 | Haller | B60N 2/508 |
| 9,227,529 B2* | 1/2016 | Haller | B60N 2/508 |
| 9,579,995 B2* | 2/2017 | Haller | B60N 2/06 |
| 2010/0007165 A1 | 1/2010 | Kusanagi et al. | |
| 2014/0217796 A1* | 8/2014 | Haller | B60N 2/508 297/344.26 |

FOREIGN PATENT DOCUMENTS

| | | |
|---|---|---|
| DE | 10 2010 000 868 B4 | 3/2012 |
| DE | 10 2010 053802 B3 | 5/2012 |
| DE | 10 2011 012973 B3 | 8/2012 |
| FR | 2 486 787 A1 | 1/1982 |
| GB | 2 396 102 A | 6/2004 |
| GB | 2 459 132 A | 10/2009 |
| WO | 93/18318 A1 | 9/1993 |

\* cited by examiner

ROTATIONAL DEVICE FOR A VEHICLE SEAT, AND VEHICLE SEAT

CROSS REFERENCE TO RELATED APPLICATIONS

This application is a United States National Phase Application of International Application PCT/EP2014/071739 filed Oct. 10, 2014 and claims the benefit of priority under 35 U.S.C. §119 of German Patent Applications 10 2013 221 095.7 filed Oct. 17, 2013 and 10 2014 201 454.9 filed Jan. 28, 2014, the entire contents of which are incorporated herein by reference.

FIELD OF THE INVENTION

The invention relates to a rotational device for a vehicle seat having a base component and a seat part support which is rotatable about a rotation axis relative to the base component. The invention also relates to a vehicle seat having such a rotational device.

BACKGROUND OF THE INVENTION

A rotational device of the type in question and a vehicle seat of the type in question are known from DE 10 2011 012 973 B3. The vehicle seat comprises a base component and a seat part support which is rotatable relative to the base component about a rotation axis. The seat part support is rotatably mounted about a rotation axis by means of two roller bearings and a sliding bearing. Temporary deformations of the seat part support may occur due to excitations or oscillations occurring during driving, as a result of which balls of the roller bearings temporarily lose contact with the seat part support. This can give rise to disturbing noises.

A rotational device of the type in question and a vehicle seat of the type in question are also known from DE 10 2010 053 802 B3.

SUMMARY OF THE INVENTION

A problem addressed by the invention is that of improving a rotational device and a vehicle seat of the type mentioned at the outset, in particular that of increasing a pretensioning force by means of which the seat part support is braced relative to the base component and, as a result, avoiding disturbing noises, without increasing frictional forces which occur upon rotation of the seat part support.

According to of the invention a rotational device of the type in question for a vehicle seat comprises a base component and a seat part support which is rotatable about a rotation axis relative to the base component. The base component has a preferably plate-like shape and serves for fastening the vehicle seat in the vehicle. A seat unit can be fastened to the seat part support, which likewise has a preferably plate-like shape. At least three roller bearings are provided for the rotatable bearing of the seat part support.

In this way, a more uniform distribution of pressure and distribution of force to the roller bearings is achieved, and disturbing noises caused by vibrations are avoided.

The seat part support is preferably shaped like a plate, a first roller bearing being arranged on a flat face of the seat part support, and a second roller bearing and a third roller bearing being arranged on the opposite flat face of the seat part support.

Advantageously, the roller bearings are each arranged in a circular track, wherein the first roller bearing extends at a first bearing distance circularly around the rotation axis, the second roller bearing extends at a second bearing distance circularly around the rotation axis, and the third roller bearing extends at a third bearing distance circularly around the rotation axis. The bearing distances each define a radius of the corresponding circular track.

According to an advantageous embodiment of the invention, the first bearing distance is smaller than the second bearing distance and larger than the third bearing distance. In the radial direction with respect to the rotation axis, the first roller bearing thus lies between the second roller bearing and third roller bearing. A force introduced via the first roller bearing is thus distributed to the second roller bearing and the third roller bearing.

To secure the seat part support, a locking disk is advantageously provided, which is rigidly connected to the base component. The locking disk likewise has a preferably plate-like shape. The locking disk is preferably screwed onto the base component.

If the seat part support is arranged between the base component and the locking disk, the seat part support is secured, and a movement of the seat part support in the direction of the rotation axis is prevented.

It is preferable that exactly one roller bearing is arranged between the locking plate and the seat part support. Preferably, exactly two roller bearings are arranged between the base component and the seat part support.

According to an advantageous embodiment of the invention, the roller bearings are designed as ball bearings and have balls that run in circular ball raceways.

According to an advantageous embodiment of the invention, a U-shaped catch hook is provided in order to prevent the seat part support being moved away from the base component.

According to an advantageous embodiment of the invention, the catch hook bears on the seat part support and is rigidly connected thereto.

According to another advantageous embodiment of the invention, the catch hook is arranged behind the seat part support as seen in the direction of travel x.

According to an advantageous embodiment of the invention, the catch hook is screwed onto the seat part support.

The problem is also solved by a vehicle seat having at least one rotational device according to the invention.

The invention is explained in more detail below on the basis of an advantageous illustrative embodiment shown in the figures. However, the invention is not limited to this illustrative embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
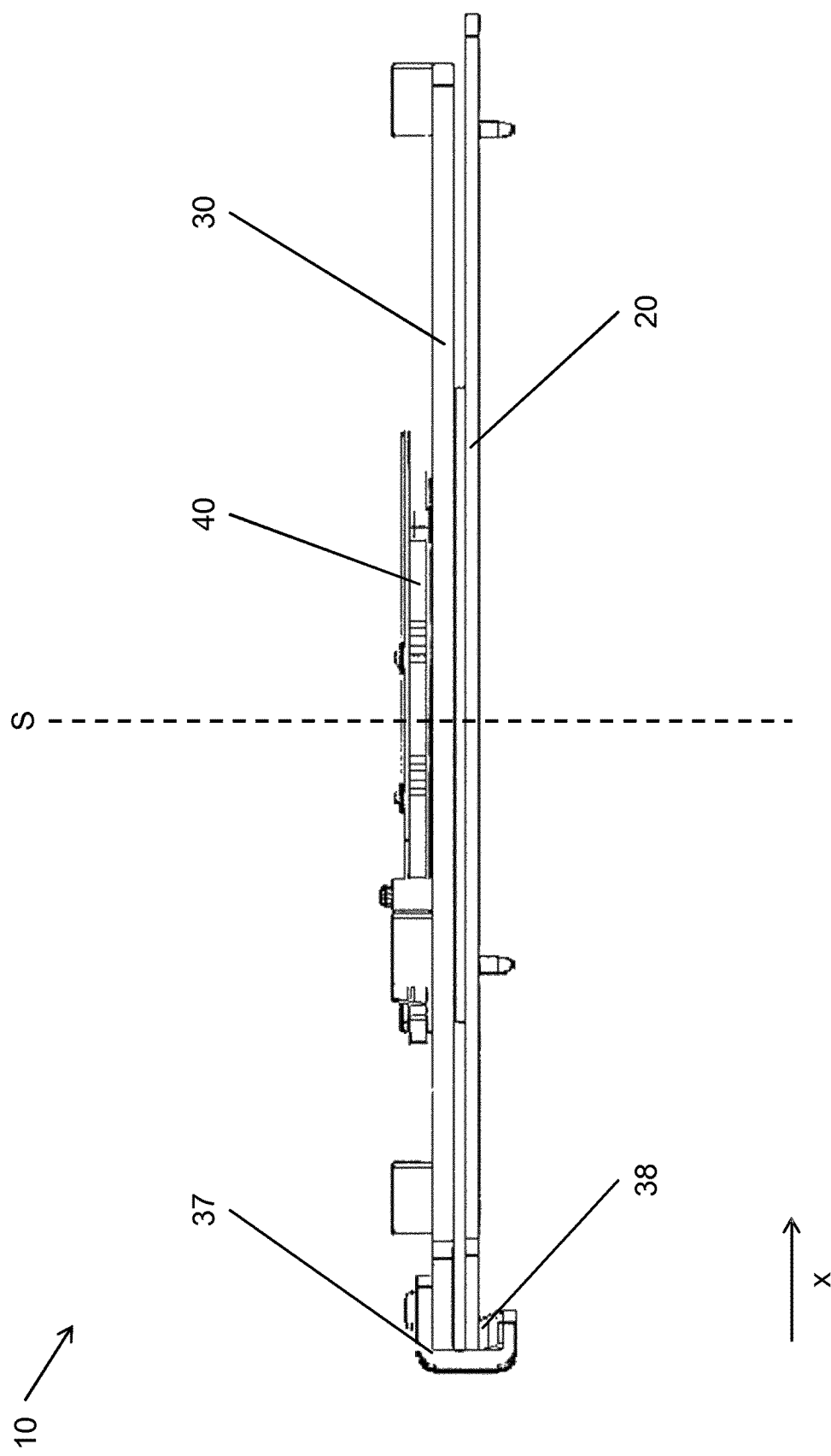
FIG. 1 is a side view of a rotational device.
Figure 2:
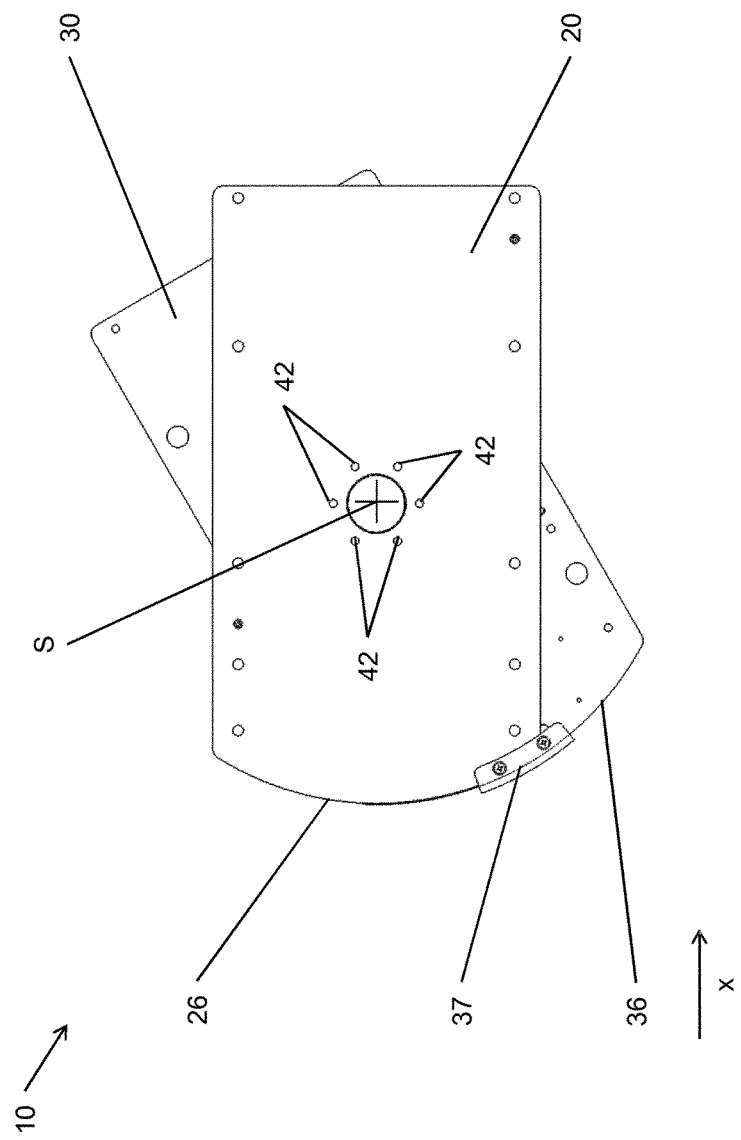
FIG. 2 is a bottom view of the rotational device according to FIG. 1 in a rotated position.
Figure 3:
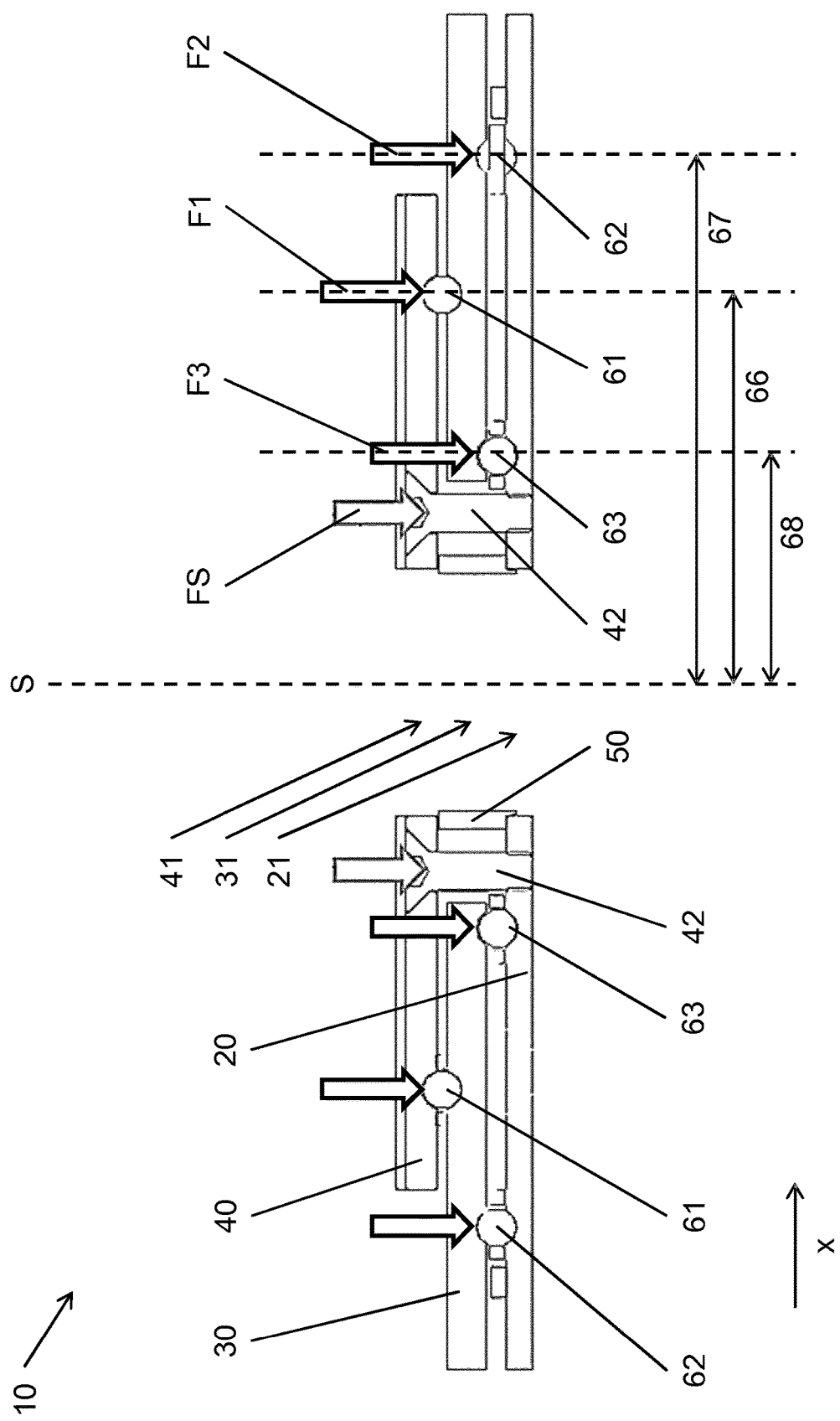
FIG. 3 is a sectional view through a central area of the rotational device according to FIG. 1.
Figure 4:
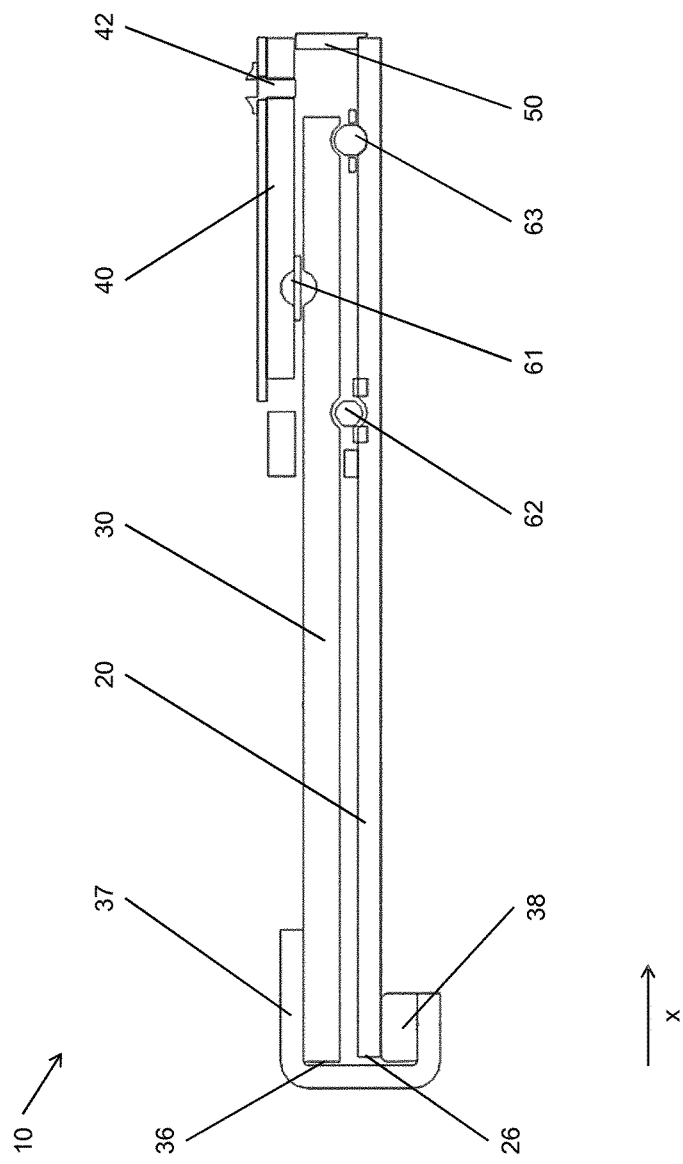
FIG. 4 is a sectional view through a side area of the rotational device according to FIG. 1.

A rotational device 10 is arranged in a vehicle (not shown here), in the present case in a utility vehicle, and supports a seat unit (not shown here). The seat unit and the rotational device 10 form a vehicle seat. The rotational device 10 is fastened, in the present case screwed, to a structure of the vehicle or to a podium-like console. In this case, the console is fastened to the floor of a passenger cell of the vehicle.

The arrangement of the vehicle seat and of the rotational device 10 inside the vehicle and the usual direction of travel x of the vehicle define the directional indicators used in the text below. A direction oriented perpendicularly with respect to the ground is designated below as the vertical direction, and a direction perpendicular to the vertical direction and perpendicular to the direction of travel x is designated below as the transverse direction.

The rotational device 10 has an approximately rectangular plate-like base component 20. A front face of the base component 20, situated to the front in the direction of travel, and lateral faces of the base component 20 are approximately rectilinear. A catch face 26 of the base component 20, situated to the rear in the direction of travel x, is designed in the shape of an arc of a circle. By means of screws (not shown), the base component 20 is screwed onto the structure of the vehicle.

The rotational device 10 likewise has an approximately rectangular plate-like seat part support 30 of approximately the same size and shape as the base component 20. The seat part support 30 is mounted on the base component 20 so as to be rotatable about a rotation axis S extending in the vertical direction. A front face of the seat part support 30, situated to the front in the direction of travel x, and lateral faces of the seat part support 30 are approximately rectilinear. A rear face 36 of the seat part support 30, situated to the rear in the direction of travel, is designed in the shape of an arc of a circle. By means of screws (not shown), the seat part support 30 is screwed onto the seat unit of the vehicle seat.

A geometric center point of the arc of the catch face 26 of the base component 20 lies on the rotation axis S. A geometric center point of the arc of the rear face 36 of the seat part support 30 likewise lies on the rotation axis S. When the rotational device 10 is located in the basic position, the seat part support 30 is oriented in the direction of travel x and the catch face 26 of the base component 20 is flush with the rear face 36 of the seat part support 30.

A circular locking disk 40 is arranged in the vertical direction above the seat part support 30 and is rigidly connected to the base component 20. The seat part support 30 thus lies, in the vertical direction, between the base component 20 and the locking disk 40.

The base component 20 has a first through-opening 21, which in the present case is designed as a circular bore. The seat part support 30 has a second through-opening 31, which in the present case is designed as a circular bore. The locking disk 40 has a third through-opening 41, which in the present case is designed as a circular bore.

The second through-opening 31 has a larger internal diameter than the first through-opening 21. The third through-opening 41 has an internal diameter of approximately the same size as the first through-opening 21. The rotation axis S extends centrally through the first through-opening 21, the second through-opening 31 and the third through-opening 41.

A locking mechanism (not shown here) is arranged on the seat part support 30 and comprises a two-armed locking lever, which is mounted rotatably about a locking axis arranged parallel to the rotation axis S. A projection is arranged on a first arm of the locking lever and, by means of a pretensioned draw spring engaged on the free end of the first arm, is loaded into a groove-shaped recess of the locking disk 40 with form-fit and force-fit engagement and, when engaged in the groove, locks the seat part support 30 is its momentary position of rotation. By acting manually on the free end of the second arm of the locking lever counter to the force of the draw spring, the projection is moved out of the groove and the locking of the seat part support 30 is canceled, as a result of which the seat part support 30 is rotatable relative to the base component about the rotation axis S.

A support ring 50 bears with a lower face on the base component 20 and passes through the second through-opening 31 coaxially with respect to the rotation axis S. The locking disk 40 bears on an upper face of the support ring 50. The external diameter of the support ring 50 is larger than the internal diameter of the first through-opening 21 and larger than the internal diameter of the third through-opening 41. The internal diameter of the support ring 50 is slightly smaller than the internal diameter of the first through-opening 21 and slightly smaller than the internal diameter of the third through-opening 41.

On its lower face bearing on the base component 20, the support ring 50 in the present case has a protruding annular shoulder which, for exact positioning of the support ring 50, protrudes into the first through-opening 21 of the base component 20. The support ring 50 can also have a protruding annular shoulder on its upper face bearing on the locking disk 40, which annular shoulder, for exact positioning of the support ring 50, protrudes into the third through-opening 41 of the locking disk 40.

The locking disk 40 is fastened to the base component 20 by means of a plurality of bearing screws 42, in the present case six bearing screws 42. The bearing screws 42 extend through through-bores provided for them in the locking disk 40 and are screwed into threaded bores of the base component 20.

The bearing screws 42 are arranged on a circumferential line of a circle whose center point lies on the rotation axis S, and they are distributed uniformly on the circumferential line of the circle. The bearing screws 42 are thus arranged at the same distance from the rotation axis S, this distance being greater that the outer radius of the support ring 50 but smaller than the inner radius of the second through-opening 31. The bearing screws 42 are thus located radially between the support ring 50 and the seat part support 30 with respect to the rotation axis S.

A first roller bearing 61 is arranged in the vertical direction between the locking disk 40 and the seat part support 30. The first roller bearing 61 extends circularly around the rotation axis S and is arranged, in the radial direction, at a first bearing distance 66 from the rotation axis S.

A second roller bearing 62 is arranged in the vertical direction between the seat part support 30 and the base component 20. The second roller bearing 62 extends circularly around the rotation axis S and is arranged, in the radial direction, at a second bearing distance 67 from the rotation axis S.

A third roller bearing 63 is arranged in the vertical direction between the seat part support 30 and the base component 20. The third roller bearing 63 extends circularly around the rotation axis S and is arranged, in the radial direction, at a third bearing distance 68 from the rotation axis S.

The second bearing distance 67 is greater than the first bearing distance 66, which is greater than the third bearing distance 68. The third bearing distance 68 is also greater than the inner radius of the second through-opening 31.

By means of the roller bearings 61, 62, 63, which in the present case are designed as ball bearings, the seat part support 30 is supported between the base component 20 and the locking disk 40 and is mounted rotatably about the rotation axis S relative to the base component 20 and to the locking disk 40. For this purpose, the roller bearings 61, 62, 63 have suitable ball raceways and balls.

When the bearing screws 42 are screwed fast with a tightening torque, they exert a tightening force FS, which draws the locking disk 40 and the base component 20 toward each other and thus braces the locking disk 40 against the base component 20.

On account of the tightening force FS of the bearing screws 42, the locking plate 40 presses with a first bearing force F1 on the first roller bearing 61, which in turn presses with the first bearing force F1 on the seat part support 30.

The direction of action of the first bearing force F1 depends on the configuration of the ball raceways of the first roller bearing 61. In the present case, the first bearing force F1 acts in the vertical direction. However, the first bearing force F1 can also have a component in the vertical direction and a component in the radial direction with respect to the rotation axis S.

The seat part support 30 presses with a second bearing force F2 on the second roller bearing 62 and with a third bearing force F3 on the third roller bearing 63. The second roller bearing 62 in turn presses with the second bearing force F2 on the base component 20, and the third roller bearing 63 in turn presses with the third bearing force F3 on the base component 20.

The directions of action of the second bearing force F2 and of the third bearing force F3 depend on the configurations of the ball raceways of the second roller bearing 62 and of the third roller bearing 63. In the present case, the second bearing force F2 and the third bearing force F3 each act in the vertical direction. The second bearing force F2 and the third bearing force F3 can also each have a component in the vertical direction and a component in the radial direction with respect to the rotation axis S.

The ratio of the second bearing force F2 to the third bearing force 63 can be chosen by suitable choice of the first bearing distance 66 in relation to the second bearing distance 67 and to the third bearing distance 68.

In particular, the ratio of the vertically acting component of the second bearing force F2 to the vertically acting component of the third bearing force F3 can be chosen by suitable choice of the first bearing distance 66 in relation to the second bearing distance 67 and to the third bearing distance 68.

By reducing the difference between the first bearing distance 66 and the second bearing distance 67, while at the same time increasing the difference between the first bearing distance 66 and the third bearing distance 68, the vertically acting component of the second bearing force F2 is increased, and the vertically acting component of the third bearing force F3 is reduced. By reducing the difference between the first bearing distance 66 and the third bearing distance 68, while at the same time increasing the difference between the first bearing distance 66 and the second bearing distance 67, the vertically acting component of the second bearing force F2 is reduced, and the vertically acting component of the third bearing force F3 is increased.

In the present case, the first bearing distance 66 is chosen in relation to the second bearing distance 67 and to the third bearing distance 68 in such a way that the vertically acting component of the second bearing force F2 and also the vertically acting component of the third bearing force F3 always have a sufficient magnitude. This avoids a situation where vibrations or oscillations acting on the rotational device 10 cause the seat part support 30 to be deflected in the vertical direction or to be bent in such a way that balls of the second roller bearing 62 or balls of the third roller bearing 63 lose contact with the seat part support 30 and/or the base plate 20.

A catch hook 37 is mounted in a central area of the rear face 36 of the seat part support 30. The catch hook 37 is U-shaped, with an upper limb of the catch hook 37 extending horizontally, bearing in the vertical direction on the seat part support 30 and being rigidly connected, in the present case screwed, onto the latter. Alternatively, the catch hook 37 can also be welded onto the seat part support 30.

A base portion of the catch hook 37, which is located behind the seat part support 30 in the direction of travel x, extends from the upper limb of the catch hook 37 downward in the vertical direction to a point below the base component 20. In the basic position of the rotational device 10, a lower limb of the catch hook 37 extends forward from the base portion of the catch hook 37 in the direction of travel and, parallel to the upper limb of the catch hook 37, under the base component 20.

Thus, in the vertical direction, the catch hook 37 engages around the base component 20 and the seat part support 30. A slide element 38, which in the present case is made of plastic, is mounted on the lower limb of the catch hook 37, on the side facing toward the upper limb. When the rotational device 10 is located in the basic position, the slide element 38 is located in the vertical direction between the lower limb of the catch hook 37 and the base component 20 and bears on the base component 20.

When the rotational device 10 is located in the basic position, the slide element 38 prevents the catch hook 37 from directly touching the base component 20. In the event of vibrations or oscillations, this therefore avoids the creation of disturbing noise.

The catch hook 37 also constitutes a crash safeguard for the rotational device 10, in particular in the event of a head-on collision. In the event of a crash, the catch hook 37 prevents the seat part support 30 and the base component 20 from being torn apart.

When the seat part support 30, having been unlocked, is rotated from the basic position about the rotation axis S relative to the base component 20, the catch hook 37 moves with the slide element 38 along the catch face 26 of the base component 20. The catch hook 37 engages around the base component 20 as far as a rotation of in the present case approximately 30° from the basic position. Starting from a rotation of in this case more than 30° from the basic position, the catch hook 37 withdraws from the base component 20.

The slide element 38 has beveled side faces. When the seat part support 30 is rotated back to the basic position from a position in which it has been rotated beyond 30°, the beveled side faces of the slide element 38 facilitate the insertion of the base component 20 into the catch hook 37.

The features disclosed in the above description, in the claims and in the drawings may be of significance both individually and also in combination with one another for the implementation of the invention in the various embodiments thereof.

While specific embodiments of the invention have been shown and described in detail to illustrate the application of the principles of the invention, it will be understood that the invention may be embodied otherwise without departing from such principles.

The invention claimed is:

1. A rotational device for a vehicle seat, comprising:
a base component;
a plate-shaped seat part support which is rotatable about a rotation axis relative to the base component; and
at least three roller bearings rotatably bearing the seat part support, wherein a first roller
bearing of the at least three roller bearings is arranged on a flat face of the seat part support, and a second roller bearing of the at least three roller bearings and a third roller bearing of the at least three roller bearings are arranged on an opposite flat face of the seat part support, the first roller bearing extending at a first bearing distance circularly around the rotation axis, and the second roller bearing extending at a second bearing distance circularly around the rotation axis, and the third roller bearing extending at a third bearing distance circularly around the rotation axis.

2. The rotational device as claimed in claim 1, wherein the first bearing distance is smaller than the second bearing distance, and the first bearing distance is larger than the third bearing distance.

3. The rotational device as claimed in claim 1, further comprising a locking disk rigidly connected to the base component.

4. The rotational device as claimed in claim 3, wherein the locking disk is screwed onto the base component.

5. The rotational device as claimed in claim 3, wherein the seat part support is arranged between the base component and the locking disk.

6. The rotational device as claimed in claim 3, wherein exactly one roller bearing is arranged between the locking plate and the seat part support.

7. The rotational device as claimed in claim 3, wherein exactly two roller bearings are arranged between the base component and the seat part support.

8. The rotational device as claimed in claim 1, wherein the roller bearings are designed as ball bearings.

9. The rotational device as claimed in claim 1, further comprising a catch hook connected to the seat part support.

10. The rotational device as claimed in claim 9, wherein the catch hook bears on the seat part support and is rigidly connected thereto.

11. The rotational device as claimed in claim 9, wherein the catch hook is arranged behind the seat part support as seen in a direction of travel of a vehicle.

12. The rotational device as claimed in claim 11, wherein the catch hook is screwed onto the seat part support.

13. A vehicle seat, comprising at least one rotational device comprising:
a base component;
a plate-shaped seat part support which is rotatable about a rotation axis relative to the base component; and
at least three roller bearings rotatably bearing the seat part support, wherein a first roller bearing of the at least three roller bearings is arranged on a flat face of the seat part support, and a second roller bearing of the at least three roller bearings and a third roller bearing of the at least three roller bearings are arranged on an opposite flat face of the seat part support, the first roller bearing extending at a first bearing distance circularly around the rotation axis, and the second roller bearing extending at a second bearing distance circularly around the rotation axis, and the third roller bearing extending at a third bearing distance circularly around the rotation axis.

14. A vehicle seat as claimed in claim 13, wherein the first bearing distance is smaller than the second bearing distance, and the first bearing distance is larger than the third bearing distance.

15. A vehicle seat as claimed in claim 13, further comprising a locking disk rigidly connected to the base component, wherein the locking disk is screwed onto the base component and the seat part support is arranged between the base component and the locking disk.

16. A vehicle seat as claimed in claim 15, wherein exactly one roller bearing is arranged between the locking plate and the seat part support and exactly two roller bearings are arranged between the base component and the seat part support.

* * * * *